(12) United States Patent
Brandner et al.

(10) Patent No.: US 6,702,974 B2
(45) Date of Patent: Mar. 9, 2004

(54) METHOD FOR INJECTION MOLDED COMPONENT WITH FUEL VAPOR BARRIER LAYER

(75) Inventors: Brian W. Brandner, Kingsville (CA); Paul Michael McDonald, Windsor (CA); Christopher K. Quick, Windsor (CA); Robert L. Walter, Caro, MI (US)

(73) Assignee: Walbro Corporation, Cass City, MI (US)

( * ) Notice: Subject to any disclaimer, the term of this patent is extended or adjusted under 35 U.S.C. 154(b) by 182 days.

(21) Appl. No.: 09/817,570

(22) Filed: Mar. 26, 2001

(65) Prior Publication Data

US 2002/0136864 A1 Sep. 26, 2002

(51) Int. Cl.⁷ .......................... B29C 45/14; B29C 45/16
(52) U.S. Cl. ........................ 264/254; 264/255; 264/265
(58) Field of Search ................. 264/250, 254, 264/255, 261, 263, 275, 265, 328.8, 328.7; 156/242, 245, 314

(56) References Cited

U.S. PATENT DOCUMENTS

| | | | | |
|---|---|---|---|---|
| 3,409,714 A | * | 11/1968 | Strugar, Jr. | 222/105 |
| 3,717,544 A | * | 2/1973 | Valyi | 156/242 |
| 3,801,402 A | * | 4/1974 | Suter | 156/182 |
| 4,144,305 A | * | 3/1979 | Cottrell et al. | 156/245 |
| 4,174,245 A | * | 11/1979 | Martineau | 156/245 |
| 4,699,809 A | * | 10/1987 | Maruhashi et al. | 264/129 |
| 5,129,544 A | * | 7/1992 | Jacobson et al. | 220/4.14 |
| 5,231,811 A | * | 8/1993 | Andrepont et al. | 220/565 |
| 5,928,745 A | * | 7/1999 | Wood et al. | 428/35.4 |
| 5,961,902 A | * | 10/1999 | Ishitoya et al. | 156/79 |
| 6,103,047 A | * | 8/2000 | Ogawa | 156/245 |
| 6,161,879 A | | 12/2000 | Ries et al. | |

FOREIGN PATENT DOCUMENTS

DE 19641751 A1 4/1998

\* cited by examiner

Primary Examiner—Angela Ortiz
(74) Attorney, Agent, or Firm—Reising, Ethington, Barnes, Kisselle, P.C.

(57) ABSTRACT

An injection molded component having at least one structural layer of material and at least one fuel vapor barrier layer carried by the structural layer, and a method of making it utilizing separately injection molded structural and fuel vapor barrier layers. The vapor barrier layer may be trapped between two other interconnected layers, or may be bonded to a structural layer by an adhesive. In one form, a fuel vapor barrier layer and a structural layer are separately molded onto a preformed adhesive layer. Desirably, the heat generated during the steps of molding both the vapor barrier layer and the structural layer onto the adhesive layer is sufficient to activate the adhesive and bond the layers together. In another form, a fuel vapor barrier layer is bonded to a layer comprised of a blend of structural and adhesive materials. In yet another form, a fuel vapor barrier layer is disposed and captured between two interconnected structural layers.

19 Claims, 2 Drawing Sheets

METHOD FOR INJECTION MOLDED COMPONENT WITH FUEL VAPOR BARRIER LAYER

FIELD OF THE INVENTION

This invention relates generally to injection molding of plastics and more particularly to an injection molded plastic component having a fuel vapor barrier layer and a method of making it.

BACKGROUND OF THE INVENTION

Increasingly strict governmental regulations regarding the emission and escape to the atmosphere of hydrocarbon vapors are being continually promulgated. In various fuel systems, plastic fuel tanks are utilized because they are relatively inexpensive to produce, resistant to corrosion and lightweight. To reduce the escape to the atmosphere of hydrocarbon vapors from these fuel tanks a fuel vapor barrier layer is incorporated into the plastic fuel tank to inhibit and reduce the permeation of fuel vapors therethrough.

While the vapor barrier layer is generally effective at inhibiting fuel vapor permeation through the fuel tank walls themselves, various openings are formed through the fuel tanks to provide access to its interior. One hole preferably has a fill pipe attached thereto to permit fuel to be added to the fuel tank. One or more additional holes may be provided to receive a fuel pump, fuel vapor vent valve and other components desired to be disposed within the fuel tank. Closures for these openings have been formed from solely the structural material of the fuel tank, for example, high density polyethylene. Therefore, these closures provide less resistance to the permeation of hydrocarbon fuel vapors therethrough and undesirably increase the hydrocarbon emissions from the fuel tank. Providing a fuel vapor barrier layer on the closures is difficult and expensive because the materials typically used to form the barrier layer are not readily bondable or weldable to the structural material. Further, coextruding and thereafter molding a multiple layered polymeric article, as is typically done for multiple layer plastic fuel tanks, is difficult to control and relatively expensive.

SUMMARY OF THE INVENTION

An injection molded component having at least one structural layer of material and at least one fuel vapor barrier layer carried by the structural layer, and a method of making it utilizing separately formed structural and fuel vapor barrier layers. The vapor barrier layer may be trapped between two other interconnected layers, or may be bonded to a structural layer by an adhesive. In one form, an adhesive polymeric layer is separately injection molded. A fuel vapor barrier layer is then molded on one side of the adhesive layer and the adhesive layer is heated to activate the adhesive and bond it to the fuel vapor barrier layer. Thereafter, a structural layer of material, such as a layer of high density polyethylene (HDPE), is molded onto the other side of the adhesive layer and the adhesive layer is heated to activate the adhesive and bond the adhesive and structural layers together. In this manner, both the HDPE layer and the vapor barrier layer are bonded to the adhesive layer to provide a component having structural integrity due to the HDPE layer and a high resistance to the permeation of fuel vapor therethrough due to the fuel vapor barrier layer. Desirably, the heat generated during the steps of molding both the vapor barrier layer and the structural layer onto the adhesive layer is sufficient to activate the adhesive and bond the layers together.

In another form, material used to provide the structural integrity is blended with a material used as an adhesive for the component. This structural and adhesive material blend is injection molded into its desired shape. Thereafter, a layer of a suitable fuel vapor barrier material is molded onto the preformed structural and adhesive blend layer which is heated to activate the adhesive material within the blend layer to bond the vapor barrier layer to the blend layer. Thus, according to this aspect of the invention, the component has two layers of material providing for structural integrity of the component and the desired resistance to permeation of fuel vapor therethrough. Preferably, the heat from the molding of the vapor barrier layer onto the blend layer is sufficient to activate the adhesive and bond the layers together.

In accordance with yet another aspect of the present invention, an outer structural layer is injection molded to its desired final shape. A layer of fuel vapor barrier material is molded onto one side of the outer structural layer and an inner structural layer is molded over the fuel vapor barrier layer to encapsulate the fuel vapor barrier layer between the inner and outer structural layers. A mechanical lock such as undercut or dovetail grooves may be used to join the inner and outer structural layers together and to maintain the relative location and orientation of each of the layers. Thus, in this embodiment the component has three separate layers with a fuel vapor barrier layer sandwiched between two structural layers.

In another form, the component is comprised of an insert having a vapor barrier layer and a structural and/or adhesive material with a structural layer molded onto and bonded to the insert. The insert may be formed as a multiple layer extrusion or it may be molded.

Desirably, in each embodiment the injection molded component has at least one layer providing structural integrity for the component and at least one layer which reduces or inhibits the permeation of hydrocarbon fuel vapors through the component. Accordingly, such an injection molded component may be used as a closure for an opening through a fuel tank or to define a body of a component attached to the fuel tank such as for a fuel vapor vent valve, fill nipple weldment and the like. Desirably, the structural layers of the injection molded component facilitate direct attachment of the component to a plastic fuel tank, such as by ultrasonic or other welding methods. Further, the injection molded component could be connected and sealed to a metal fuel tank as well such as by metal fasteners and a gasket or an adhesive, for example.

Objects, features and advantages of this invention include providing injection molded components with a fuel vapor barrier layer to reduce permeation of hydrocarbons through the component which facilitates sealing engagement and attachment to another object such as a fuel tank, is weldable to typical plastic fuel tanks, permits individual layers of material to be separately molded, can be formed without an adhesive layer, is of relatively simple design and economical manufacture and assembly, is durable and has a long, useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
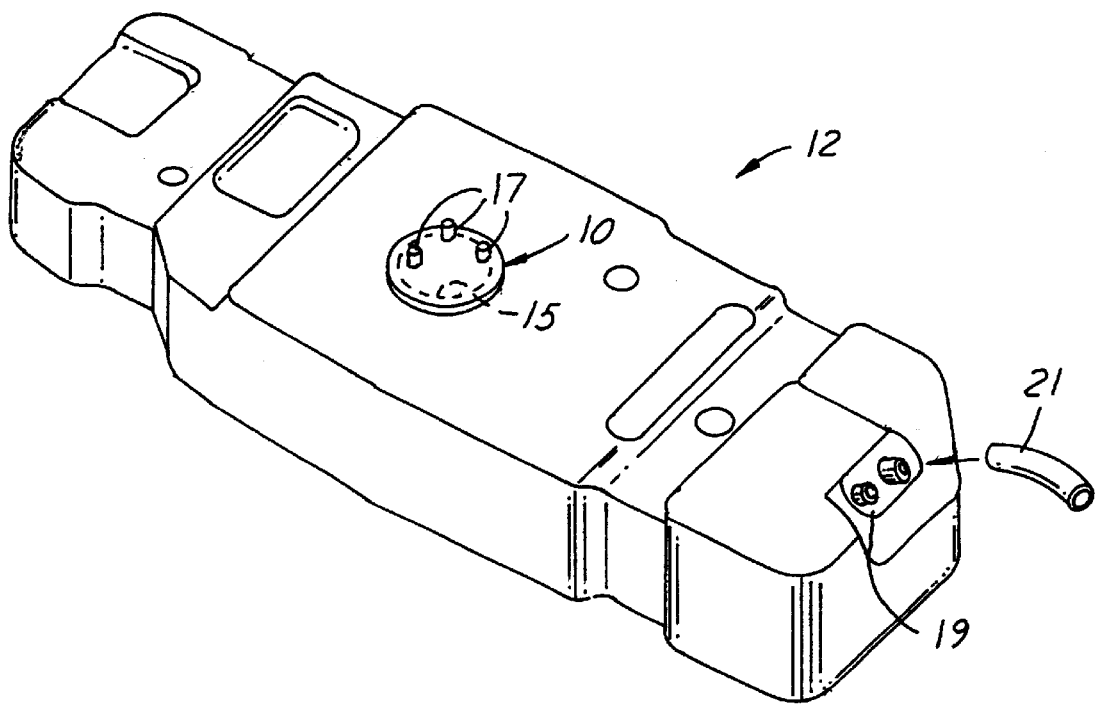
FIG. 1 is a perspective view of a fuel tank having an injection molded component according to a first embodiment of the present invention.
Figure 2:
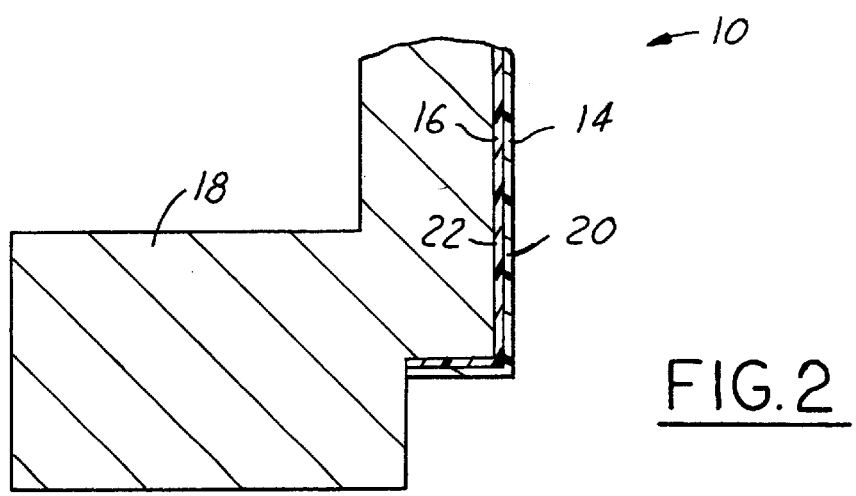
FIG. 2 is a fragmentary cross-sectional view of the injection molded component according to the first embodiment of the present invention.

Referring in more detail to the drawings, FIGS. 1 and 2 illustrate an injection molded component 10 defining a closure for a fuel tank 12 and having a fuel vapor barrier layer 14 formed of a material which inhibits the permeation of hydrocarbon fuel vapors attached by an intermediate adhesive layer 16 to a structural layer 18, preferably of high density polyethylene (HDPE). Desirably, each of the layers 14, 16, 18 of material are molded in separate steps. So formed, the component 10 has structural integrity, due mainly to the HDPE or structural layer 18, and is resistant to the permeation of hydrocarbon fuel vapors therethrough, due mainly to the fuel vapor barrier layer 14. Desirably, the component 10 may be used as a closure for an opening 15 of a fuel tank 12 having one or more nipples 17 for attachment of fuel or vent lines and electrical connectors, as needed. The component may also be, by way of example and not limitation, a weldment or other portion of various components adapted for use with the fuel tank 12 such as a fuel vapor vent valve or a fill pipe nipple weldment 19 connectable to a fill pipe 21 through which fuel is added to the fuel tank 12.

In the preferred method of forming the injection molded component 10 the adhesive layer 16 is first injection molded independently of the other layers 14, 18 to its desired final shape having, generally, two opposed sides 20, 22. In general, the material of the fuel vapor barrier layer 14 cannot be readily bonded to the material of the structural or HDPE layer 18. Therefore, the adhesive layer 16 is required between them to bond them together. The adhesive layer 14 may be formed of any suitable adhesive polymer, such as ADMER adhesive commercially available from Mitsui Chemicals. Of course, this polymeric adhesive is merely representative of a wide range of materials which may be injection molded and suitable for use as the adhesive layer 16 of the injection molded component 10. The adhesive layer 16 may be substantially any material which has an adhesive quality or component that suitably bonds together the structural and vapor barrier layers 14, 18 in the molding process as described. Since the adhesive layer 16 is provided merely to bond the fuel vapor barrier layer 14 to the structural layer 18 of HDPE, it can usually be made very thin to reduce cost. In a representative closure for a fuel tank 12, the adhesive layer 16 may be on the order of between 0.001 mm thick to 1.5 mm thick in the preferred embodiment.

The second step of forming the injection molded component preferably comprises injection molding the vapor barrier layer 14 onto one side 20 of the adhesive layer 16 and heating the adhesive layer to activate it. This may be accomplished, for example, by placing the already molded adhesive layer 16 into a mold and injecting the material for the vapor barrier layer 14 into the same mold and onto the adhesive layer 16. Desirably, the heated, molten material of the fuel vapor barrier layer 14 and the mold, if heated, transfers heat to the adhesive layer 16 to activate the adhesive and bond the adhesive material to the fuel vapor barrier material. Such bonding includes without limitation, physical or mechanical bonding and/or chemical bonding between the layers. Generally, to activate the adhesive layer formed of an ADMER adhesive, it should be heated to a temperature of between 400° F. to 600° F., and desirably between 450° F. to 550° F. In general, the higher the temperature the better the activation of the adhesive material.

The fuel vapor barrier layer 14 is formed of a material resistant to the permeation of hydrocarbon fuel vapors therethrough. Some suitable materials for this layer 14 are ethylene vinyl alcohol (EVOH) and liquid crystal polymers. The materials suitable for this layer are, in general, somewhat expensive. Therefore, the fuel vapor barrier layer is preferably formed very thin and on the order of between 0.001 mm to 2.0 mm thick. Desirably, when the injection molded component 10 is used as a closure for a fuel tank opening, the fuel vapor barrier layer 14 is continuous, uninterrupted and spans the entire opening of the fuel tank 12 to reduce the emission of hydrocarbon fuel vapors from the fuel tank 12.

The third step in forming the injection molded component 10 is to injection mold the structural layer 18 onto the opposite side 22 of the adhesive layer 16 as the vapor barrier layer 14. This may be accomplished, for example, by disposing the bonded together adhesive layer and fuel vapor barrier layer into a mold and injecting the molten HDPE for the structural layer 18 into that mold and onto the exposed side 22 of the adhesive layer 16. Again, the heat of the molten HDPE is preferably used to activate the adhesive material so that the HDPE is bonded to the adhesive layer 16. The HDPE is relatively inexpensive, creates the structural integrity of the component and hence, is preferably somewhat thicker than the adhesive layer 16 and fuel vapor barrier layer 14. For example, the structural layer 18 may be between 0.5 mm and 10.0 mm thick. This range is merely illustrative, and is not intended as a limitation of the invention. Desirably, the outer layer of a plastic fuel tank 12 with which the injection molded component may be used is preferably also formed of HDPE to facilitate bonding and sealing the injection molded component 10 to the fuel tank 12 such as by ultrasonic or other welding methods. Other materials may be used for the structural layer 18 as desired to provide the needed structural integrity of the component 10 and to facilitate bonding to both the adhesive layer 16 and to the fuel tank 12 or other object with which it is used.

Figure 3:
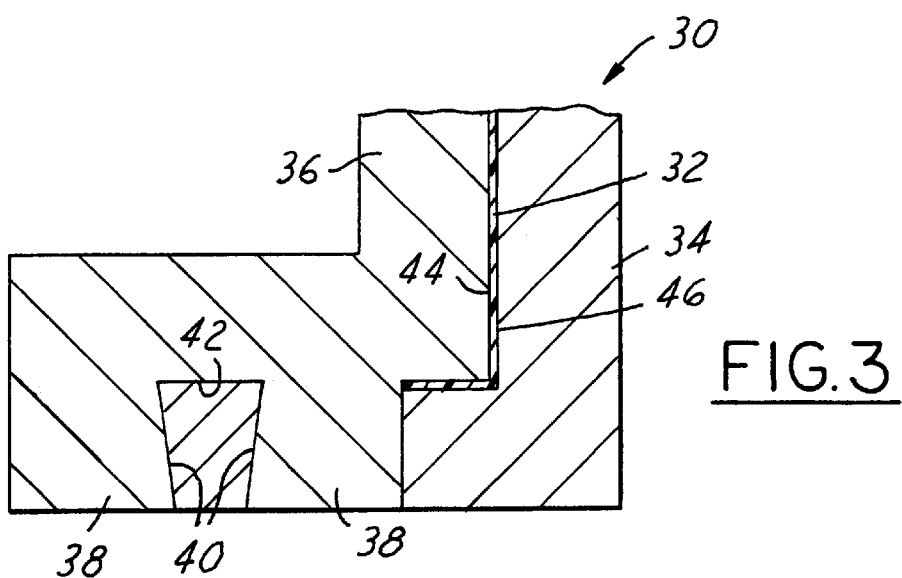
FIG. 3 is a fragmentary cross-sectional view of an injection molded component according to a second embodiment of the present invention.

As shown in FIG. 3, a molded component 30 according to a second embodiment of the invention has a fuel vapor barrier layer 32 which is overmolded and sandwiched between mechanically interlocked inner and outer layers 34, 36, respectively of HDPE. To form this injection molded component 30, preferably the outer HDPE layer 36 is injection molded as a first step. The outer HDPE layer 36 is molded to its desired final shape and includes at least a pair of outwardly projecting fingers 38 having inclined inner surfaces 40 defining an undercut groove or dovetail slot 42 between them. Next, the fuel vapor barrier layer 32 is molded onto an inside surface 44 of the outer HDPE layer 36. Finally, the inner HDPE layer 34 is molded onto a temporarily exposed surface 46 of the fuel vapor barrier layer 32 so that the fuel vapor barrier layer 32 is preferably totally encapsulated by the inner and outer HDPE layers 34, 36. The inner HDPE layer 34 is formed around the fuel vapor barrier layer 32 and the adjacent portions of the outer HDPE layer 36. The inner HDPE layer 34 fills in the dovetail slot 42 of the outer layer 36 and assumes the shape thereof to provide a dovetail mechanical interlock between the inner and outer HDPE layers 34, 36 to prevent their separation. A mechanical interlock is required because in the second embodiment there is no adhesive layer and the material of the fuel vapor barrier layer 32 does not readily bond or adhere to the HDPE of the inner and outer layers 34, 36. Accordingly, the mechanical interlock is preferably provided at several spaced apart locations about the injection molded component 30 to secure and maintain the inner and outer HDPE layers 34, 36 together with the fuel vapor barrier layer 32 trapped between them.

Figure 4:
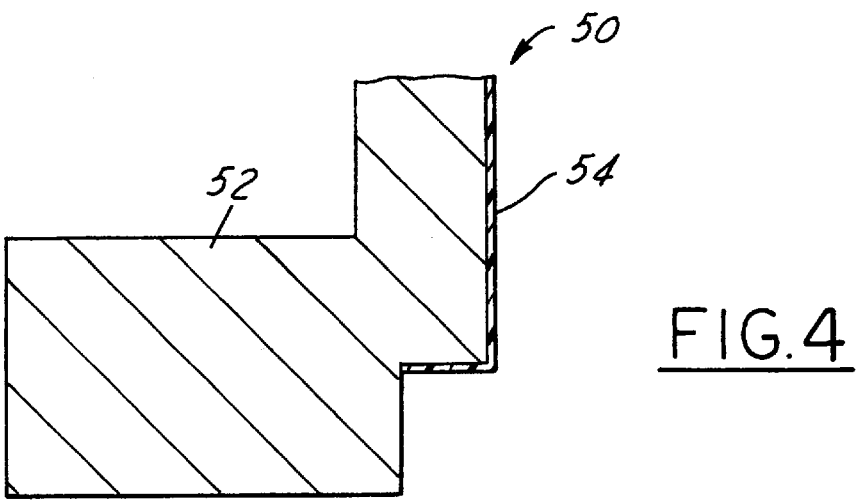
FIG. 4 is a fragmentary cross-sectional view of an injection molded component according to a third embodiment of the present invention.

As shown in FIG. 4, a molded component 50 according to a third embodiment of the invention has a structural and adhesive blend layer 52 with a fuel vapor barrier layer 54 bonded directly thereto. The blend layer 52 comprises a mixture of a structural polymeric material and an adhesive material. The structural polymeric material may be HDPE, as discussed with regard to the previous embodiments of the injection molded component. The adhesive material may similarly be an ADMER or other polymeric adhesive as previously described. The blend layer 52 may be of any suitable composition so long as it has sufficient structural integrity for the intended use of the component 50, due mainly to its HDPE content, and sufficient adhesive qualities, due mainly to its adhesive content, to permit it to bond with the fuel vapor barrier layer 54.

To form this component, the mixture of the HDPE and adhesive material is preferably first molded to its desired final shape. Thereafter, the fuel vapor barrier layer 54 is molded onto the HDPE and adhesive blend layer 52. Preferably, the heat from the step of molding the fuel vapor barrier layer 54 onto the blend layer 52 activates the adhesive in the blend layer 52 to bond the fuel vapor barrier layer 54 onto the blend layer 52. A currently preferred composition of the blend layer 52 comprises about 50 percent HDPE and 50 percent adhesive. The structural material may comprise between 10% and 99%, by weight, of the blend layer 52.

Figure 5:
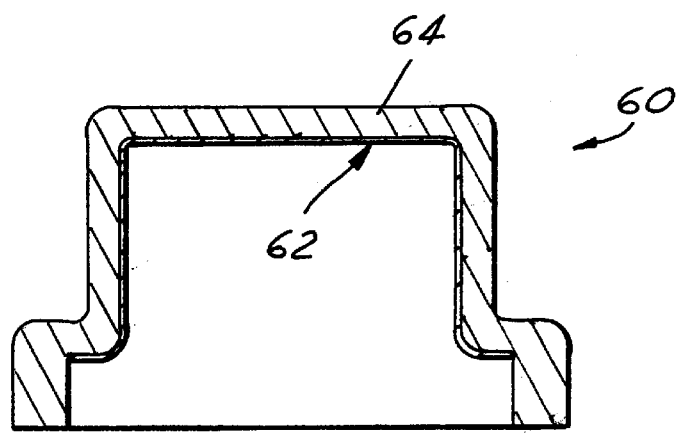
FIG. 5 is a fragmentary cross-sectional view of a molded component according to a fourth embodiment of the invention.

As shown in FIG. 5, a molded component 60 according to a fourth embodiment of the invention has a multi-layer film insert 62 with a structural layer 64 bonded directly to the insert 62. The multi-layer film insert 62 preferably comprises a multiple layer co-extrusion having layers of structural material, adhesive material and a vapor barrier material. The structural material may be HDPE, as discussed with regard to the previous embodiments of the injection molded component. The adhesive material may similarly be an ADMER or other adhesive including polymeric adhesives as previously described. The vapor barrier layer material may be EVOH or other suitable material, such as liquid crystal polymers. The multi-layer film insert 62 may be of any suitable composition so long as the fuel vapor barrier layer material is substantially continuous throughout the insert 62 to reduce or eliminate leakage of fuel vapor through the component 60. Desirably, the substantially continuous fuel vapor barrier layer could be at least 0.001 mm thick. In addition to multiple layer extrusion, the insert 62 may be formed by other methods including injection molding.

To form this component, the multi-layer film insert 62 is preferably first molded or otherwise formed to its desired shape. Thereafter, the structural HDPE layer is molded onto the insert 62. Preferably, the heat from the molding of the structural layer 64 onto the insert 62 activates the adhesive in the insert 62 and preferably also causes some melting of the HDPE in the insert 62 to bond the structural layer 64 to the insert 62. The insert 62 may be formed by multiple layer extrusion methods, or it may be injection molded or otherwise formed.

Accordingly, an injection molded component 10, 20, 50, 60 embodying the invention has at least one layer 18, 34 or 36, 52, 64 providing primarily the structural integrity of the component and at least one fuel vapor barrier layer 14, 32, 54, 62 carried by the structural layer to reduce hydrocarbon permeation through the component. The injection molded component 10, 30, 50, 60 may also utilize an adhesive to bond the fuel vapor barrier layer 14, 54, 62 to the structural layer 18, 52, 64. Desirably, the structural layer 18, 34 and 36, 52, 64 may be readily attached to an object such as a fuel tank 12 and the fuel vapor barrier layer 14, 32, 54, 62 increases the resistance to permeation of hydrocarbon fuel vapors through the component 10, 30, 50, 60. The structural layer 18, 34, 36, 52, 64 is preferably formed at least in part of HDPE and may be readily bonded to a polymeric fuel tank 12 itself having structural layers of HDPE. Additionally, the injection molded component 10, 30, 50, 60 may be attached to other objects, including steel fuel tanks by mechanical connectors, such as bolts or screws with a gasket between the component and the steel tank, or by an adhesive which bonds the component to the tank.

The process of forming the injection molded component 10, 30, 50, 60 can be substantially automated. In one currently contemplated form, a plurality of molds may be mounted on a carrousel and rotated from one workstation to another with each workstation injection molding a different material into the molds. Movement of the molds can be timed to permit a sufficient cooling and set-up period for each layer of the injection molded component. Additionally, to facilitate automation, the layers may be formed in an order other than that described above. Those skilled in the art will recognize still other modifications to the present invention without departing from the spirit and scope of the invention as defined by the following claims.

What is claimed is:

1. A method of forming a multiple layer polymeric component, comprising the steps of:

independently molding an adhesive layer into its desired final shape for the component, said adhesive layer having two sides;

molding into its desired final shape a vapor barrier layer directly on one side of the molded adhesive layer in a step separate from molding the adhesive layer and heating the molded adhesive layer to a temperature sufficient to activate the adhesive to bond the molded adhesive layer and vapor barrier layer together; and molding into its desired final shape a structural layer on the other side of the molded adhesive layer in a step separate from molding the adhesive layer and heating the molded adhesive layer to a temperature sufficient to activate the adhesive to bond the molded adhesive layer and structural layer together so that the vapor barrier layer is carried by the structural layer.

2. The method of claim 1 wherein the vapor barrier layer is molded onto the adhesive layer at a different time than when the structural layer is molded onto the adhesive layer.

3. The method of claim 1 wherein the vapor barrier layer is molded onto the adhesive layer at essentially the same time as the structural layer is molded onto the adhesive layer.

4. The method of claim 1 wherein the adhesive layer, vapor barrier layer and structural layer are all injection molded.

5. The method of claim 1 wherein the adhesive layer is permitted to completely cool before either the vapor barrier layer or the structural layer is molded onto the adhesive layer.

6. The method of claim 1 wherein the heat generated during the step of molding the vapor barrier layer onto the adhesive layer is used to heat the adhesive layer and to activate the adhesive.

7. The method of claim 6 wherein the adhesive layer is heated to a temperature of between 400° F. and 600° F.

8. The method of claim 1 wherein the heat generated during the step of molding the structural layer onto the adhesive layer is used to heat the adhesive layer and to activate the adhesive.

9. The method of claim 8 wherein the adhesive layer is heated to a temperature of between 400° F. and 600° F.

10. A method of forming a multiple layer polymeric component, comprising the steps of:

independently molding at least one structural layer into its desired final shape for the component;

providing a vapor barrier layer in its desired final shape for the component in a separate step from the molding of the molded structural layer; and providing a connection between the vapor barrier layer and the molded structural layer to provide a multiple layer component from the at least two separate layers which has structural integrity and is resistant to permeation of hydrocarbon fuel vapors therethrough.

11. The method of claim 10 wherein the step of providing a connection between the vapor barrier layer and the structural layer is accomplished by disposing an adhesive layer between them.

12. The method of claim 10 wherein the step of providing a connection between the vapor barrier layer and the structural layer is accomplished by molding a second structural layer, disposing the vapor barrier layer between the two structural layers, and connecting together the two structural layers to capture the vapor barrier layer between the two structural layers.

13. The method of claim 12 wherein the two structural layers have portions which are mechanically interlocked.

14. The method of claim 10 wherein the structural layer comprises a blend of a structural polymer and an adhesive polymer and the step of providing a connection between the vapor barrier layer and the structural layer is accomplished by molding the vapor barrier layer onto the structural layer and heating the structural layer to a temperature sufficient to activate the adhesive in the structural layer to bond together the structural layer and vapor barrier layer.

15. The method of claim 14 wherein the structural layer is formed from a blend of high density polyethylene and a polymeric adhesive with the high density polyethylene comprising between 10% and 99% of the structural layer by weight.

16. The method of claim 14 wherein the structural layer is heated to a temperature of between 400° F. and 600° F.

17. The method of claim 14 wherein the heat generated during the step of molding the vapor barrier layer onto the structural layer is used to heat the structural layer and activate the adhesive in the structural layer.

18. The method of claim 10 wherein the vapor barrier layer is carried by an insert having portions containing a structural material and an adhesive material and the step of providing a connection between the vapor barrier layer and the structural layer is accomplished by molding the structural layer onto the insert with the heat generated during the molding of the structural layer being sufficient to activate at least one of the adhesive material and structural material in the insert to bond the structural layer and insert together.

19. The method of claim 18 wherein the structural layer is heated to a temperature of between 400° F. and 600° F.

* * * * *